United States Patent [19]

Cardwell et al.

[11] 3,984,520

[45] *Oct. 5, 1976

[54] SEPARATION OF NICKEL AND COBALT AND MANGANESE IN SOLUTION

[75] Inventors: Paul H. Cardwell, Zanoni; James A. Olander, Gloucester Point, both of Va.

[73] Assignee: Deepsea Ventures, Inc., Gloucester Point, Va.

[ * ] Notice: The portion of the term of this patent subsequent to Dec. 17, 1991, has been disclaimed.

[22] Filed: Feb. 26, 1974

[21] Appl. No.: 445,918

Related U.S. Application Data

[63] Continuation-in-part of Ser. No. 247,693, April 26, 1972, Pat. No. 3,854,851.

[30] Foreign Application Priority Data

Apr. 19, 1973 Canada.................................. 169119

[52] U.S. Cl..................................... 423/24; 423/38; 423/46; 423/49; 423/139; 423/150

[51] Int. Cl.²..................... C01G 3/04; C01G 45/06; C01G 51/08; C01G 53/08

[58] Field of Search................ 423/49, 139, 24, 44, 423/38, 150, 149, 46; 75/101 BE, 117, 119, 110, 111

[56] References Cited

UNITED STATES PATENTS

| | | | |
|---|---|---|---|
| 2,658,813 | 11/1953 | Whitehouse et al.................. | 423/49 |
| 2,752,299 | 6/1956 | Cooper................................... | 423/49 |
| 2,777,755 | 1/1957 | Eberhardt.............................. | 423/49 |
| 3,085,875 | 4/1963 | McCarroll............................. | 423/49 |
| 3,128,156 | 4/1964 | Long et al............................. | 75/101 BE |
| 3,169,856 | 2/1965 | Mero..................................... | 75/119 |
| 3,224,873 | 12/1965 | Swanson................................ | 75/101 BE |
| 3,479,378 | 11/1969 | Orlandini et al..................... | 75/101 BE |
| 3,666,446 | 5/1972 | Cook et al............................. | 75/101 BE |
| 3,854,851 | 12/1974 | Cardwell et al..................... | 423/24 |

OTHER PUBLICATIONS

Alian et al., *Talanta,* vol. 14, pp. 659–669, (1967).
*Acta–Chemica Scandinavica,* vol. 20, pp. 1621–1625, (1966).
Ioffe et al., *Chemical Abstracts,* vol. 62, 1965, No. 12798e.

*Primary Examiner*—Oscar R. Vertiz
*Assistant Examiner*—Brian E. Hearn
*Attorney, Agent, or Firm*—Barry G. Magidoff

[57] ABSTRACT

This invention provides a process for separating the halide of cobalt, and optionally nickel, from a pregnant aqueous solution, the aqueous solution also containing a manganese halide. The process comprises initially extracting the cobalt halide and a portion of any manganese halide which is present into an organic extract. The nickel halide is then separately extracted from the solution. The manganese halide is preliminarily preferentially stripped from the organic extract containing cobalt and manganese utilizing an aqueous solution comprising halide ions. The cobalt halide in the extract can then be stripped into an aqueous solution together with the remaining manganese to form a strip solution. The manganese is then preferentially extracted from the strip solution, leaving a manganese-free, substantially pure cobalt solution. Any nickel can be selectively extracted from the manganese remaining in the pregnant solution.

21 Claims, 2 Drawing Figures

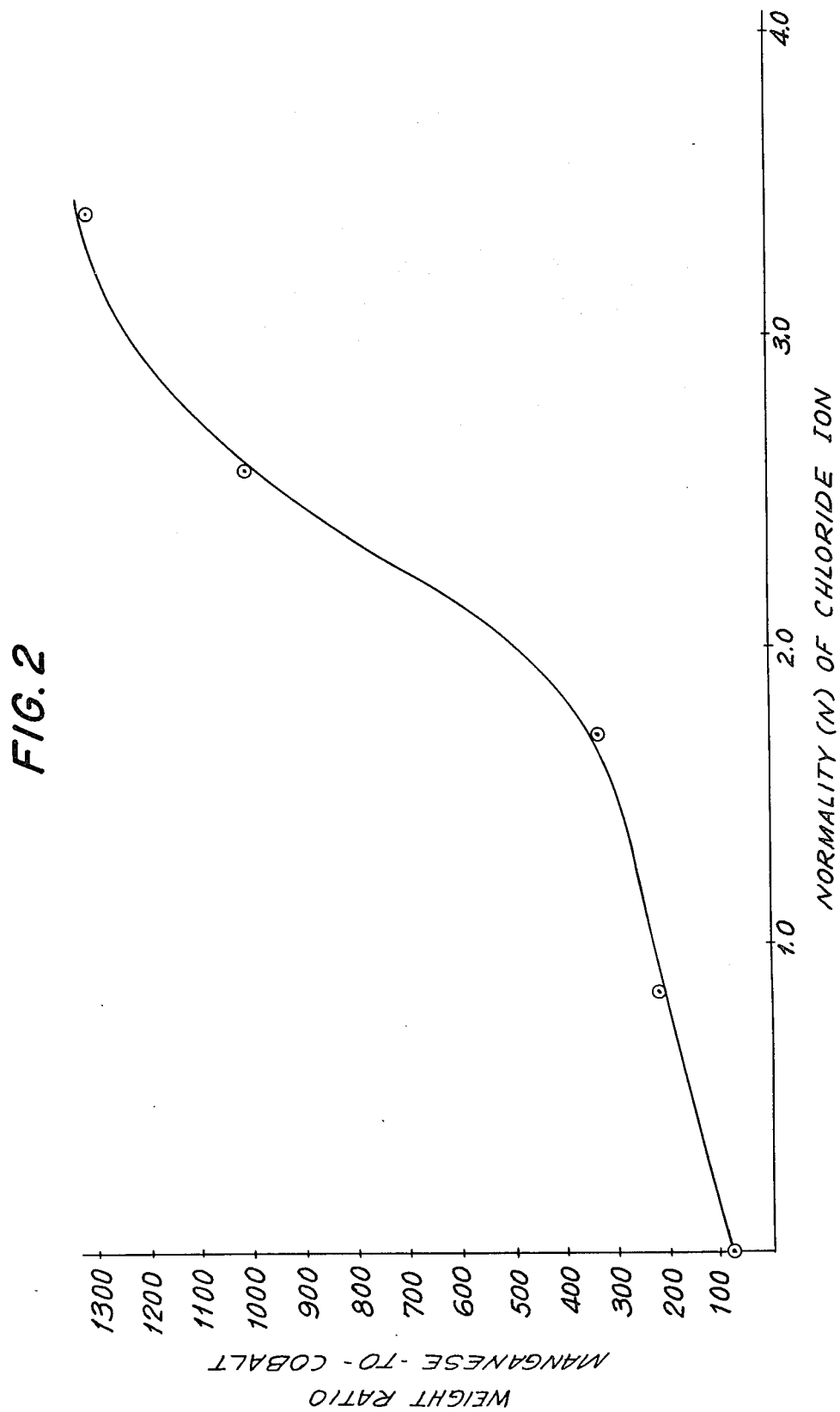

SEPARATION OF NICKEL AND COBALT AND MANGANESE IN SOLUTION

This application is a C-I-P of Ser. No. 247,693, filed Apr. 26, 1972, now U.S. Pat. No. 3,854,851.

Hydrometallurgy has become an increasingly important procedure in the refining of the relatively more precious non-ferrous metals, especially metals such as nickel, cobalt, copper and manganese. The basis for these procedures is the fact that the chelates, or liquid ion exchange reagents, and other liquid extracting agents are, or can be made, selective for one or more of the desired metal values in a solution of a mixture of metal values. Useful liquid ion exchange reagents include certain organic phosphoric acid compounds, such as the dialkyl phosphoric acids disclosed by Olsen et al. in U.S. Pat. No. 3,104,971, and the $\alpha$-hydroxyoximes described in several patents to Swanson, for example, U.S. Pat. No. 3,224,873. Amongst the most recently developed chelating, or liquid ion exchange, reagents are the substituted hydroxyquinolines which were developed apparently initially by Budde Jr., et al. and are disclosed in published South African Specification No. 69/4397.

A major problem in the hydrometallurgical field, and one which is especially significant commercially, is the difficulty of separating cobalt value from nickel value and both from other metal values in aqueous solutions. Although separation schemes have been proposed where cobalt has been extracted preferentially from a solution comprising nickel and cobalt, the separation of the two metals is incomplete. Orlandini, in U.S. Pat. No. 3,479,378 and Ashbrook, in U.S. Pat. No. 3,455,680, disclose the liquid ion exchange of aqueous solutions, using an alpha-hydroxyoxime and di-2-ethylhexyl phosphoric acid (EHPA) to separate out the various metal values. But neither discloses how to obtain a solution of a pure cobalt salt from a mixed solution comprising cobalt and nickel halides. Cook et al., U.S. Pat. No. 3,666,446, suggest the use of organic amines in conjunction with the use of a "cationic extractant", such as EHPA, for the adjusting of solution pH. Cook et al. suggest that the amines themselves are not generally suitable for a complete extraction process.

The uses of organic amines in the separation of nickel, copper and cobalt from solution containing one or more of these metals, in combination with other metals, have also been disclosed, for example, in U.S. Pat. Nos. 3,128,756; 3,003,866; 3,131,998; and 3,449,246. Other separation agents and procedures are shown in U.S. Pat. Nos. 2,822,264; 3,251,646; and 3,082,081. None of the suggested procedures resulted in a clean separation of nickel from cobalt, and the production of pure solutions of both nickel salt and cobalt salt, respectively.

One commercial problem is how to treat ores containing both nickel and cobalt, together with manganese, in economically useful proportions.

One type of ore for which selective extraction procedures have been found extremely useful, are the so-called ocean floor nodule ores. These nodule ores are treated in various ways and then leached to form an aqueous solution of the metal values from the nodule ores. The ocean floor nodule ores generate aqueous solutions comprising primarily manganese values and secondarily copper, cobalt and nickel values plus relatively small or trace quantities of a large number of other metal values.

The higher proportion of manganese, together with the presence of significant quantities of copper, cobalt and nickel, combine to render the separation of these metal values extremely difficult. For a specific analysis of the ocean floor nodule ores, see, for example, an article entitled "Extractive Metallurgy of Ocean Nodules" by Paul H. Cardwell, in Mining Congress Journal, November, 1973, pages 38 to 43.

The present invention permits the separation of cobalt values and, if desired, nickel values, from aqueous solutions which contain as primary metal value, manganese, to obtain an aqueous solution of the salt of the individual cobalt value and, if desired, a separate solution of the salt of the nickel value, and specifically the preparation of an aqueous solution of cobalt halide from an aqueous solution containing manganese, in relatively large proportions, cobalt and, optionally, nickel, as well as small amounts of a wide range of other metals.

In accordance with the present invention, individual aqueous solutions of cobalt halide and, if desired, of a salt of nickel, respectively, can be obtained from a pregnant aqueous solution comprising a primary quantity of manganese halide, and secondary quantities of cobalt halide and, optionally, of a salt of nickel, by a process comprising: (1) contacting the pregnant aqueous solution with a water-immiscible, ion exchange, liquid extracting medium, the liquid medium comprising an amine ion exchange agent designed and adapted to selectively extract cobalt, substantially without extracting any nickel, that may be present, from the pregnant solution, resulting in an aqueous solution substantially depleted in cobalt, thus forming an organic amine extract containing the cobalt value, and a minor proportion of the manganese value originally present in the pregnant aqueous solution, and a cobalt-free aqueous raffinate substantially depleted in cobalt; (2) stripping the cobalt and manganese from the organic amine extract, using a water solution, to form a cobalt strip solution containing cobalt halide and manganese halide; and (3) selectively extracting one of the cobalt and manganese values from the cobalt strip solution, so as to form two solutions, each comprising individually cobalt value and manganese value; if desired, (4) contacting the cobalt-free aqueous raffinate with a water-immiscible liquid ion exchange nickel-extracting medium, the medium comprising a nickel-extracting ion exchange agent designed and adapted to extract nickel from the aqueous solution, during which contact the pH of the aqueous solution is maintained within a desired range until the aqueous solution is substantially depleted in nickel, thus forming a nickel-containing organic extract and a final aqueous raffinate containing a major portion of the original manganese, but substantially depleted in nickel and cobalt; and (5) stripping the nickel value from the nickel-containing organic extract with an acidic aqueous solution to form an organic phase substantially depleted of nickel and an aqueous phase containing a nickel salt.

The organic amine ion exchange agent is preferably a secondary, tertiary or quaternary hydrocarbyl amine and the organic amine extract comprises a cobalt halide-amine complex. The trihydrocarbyl amines have been found to be the preferred agents.

Generally, the manganese value comprises a major proportion of the total heavy metal values dissolved in the solution. The term "heavy metal" excludes alkali metals and alkaline earth metals.

Cobalt and manganese can both be stripped from the organic amine extract using slightly acidic water as the stripping solution. The stripping water is preferably sufficiently acidic, e.g., having a pH of not greater than from about 2 to about 6 and preferably about 2 to about 3.5, to prevent the precipitation of the cobalt and manganese hydroxides. There is substantially no minimum pH, except that the stronger the acid, usually the more expensive the reagent.

To separate the cobalt and manganese values in the cobalt strip solution, the manganese value is selectively extracted from the cobalt strip solution using, for example, a phosphoric acid diester liquid ion exchange extracting medium. The extraction is carried out at a pH of at least about 2, and preferably about 2.5 to about 3.5, to form an organic phosphate diester extract containing the manganese value and an aqueous raffinate solution containing the cobalt value and substantially depleted in manganese. The manganese value can be readily stripped from the organic phosphate diester extract using an acidic aqueous solution, preferably of a strong mineral acid.

Since the use of a substantial quantity of this acid stripping solution is expensive, the amount of manganese that must be extracted by the phosphoric acid diester and subsequently stripped can be reduced in this preferred aspect of this invention by preliminarily stripping the organic amine extract with an aqueous solution comprising halide ion, preferably the chloride ion. The presence of halide ion in the preliminary stripping solution results in the preferential stripping of the manganese by suppressing the stripping of the cobalt value to a substantial degree. The effect is found with even a relatively low concentration of halide ion. However, preferably, a concentration of at least about 0.5 Molar halide ion is present in the preliminary stripping solution. It is most preferred that a concentration of at least about 2 Molar halide ion is present to reduce as much as possible the amount of cobalt preliminarily stripped with the manganese. Optimally, the preliminary stripping solution is a substantially saturated halide salt solution.

The preliminary stripping solution is an acidic solution of a halide salt of a metal which is not extractable by the extracting medium and includes the halides of the alkali metals and the alkaline earth metals, as well as ammonium halides, preferably having a pH not greater than about 6. The maximum pH does not affect the stripping, but is regulated to prevent precipitation of any cobalt or manganese hydroxides which is undesirable. Most preferably, the pH of the preliminary stripping solution is in the range of from about 2 to about 6.

Following the preliminary stripping to remove a substantial proportion of the manganese value, the remaining cobalt values and manganese values in the organic amine extract can be stripped using a slightly acid water, or aqueous solution, and the stripped manganese selectively extracted, as described above, from the strip solution.

In order to extract the cobalt value from the pregnant aqueous solution, it is desirable to have a halide ion concentration in the pregnant aqueous solution of at least about 4 Normal. It is believed that this results in the formation of the cobalt tetrahalide complex, e.g. cobalt tetrachloride ion $CoCl_4^=$. It is generally believed that it is this complex which is actually extracted into the organic amine solution. The form in which the manganese is extracted into the organic solution is not definitely known. However, it is known that when the organic amine extract phase, containing both cobalt and manganese, is contacted with water having a slightly acid pH, but substantially no halide ion, the resulting aqueous strip solution contains cobalt halide and manganese halide.

It is desirable to maintain the pH of the water used to strip the cobalt and manganese values from the organic amine extract below that at which a precipitate would form.

Manganese can be stripped from a liquid ion exchange extract phase, e.g., a phosphate diester extract, using an acid aqueous stripping solution. There must be at least a stoichiometric amount of hydrogen ion present in the stripping solution to replace all of the manganese in the extract phase. Useful acids include those listed below for nickel and likewise determine the manganese salt obtained in the strip solution.

Following extraction of the manganese from the cobalt strip solution, it may be desirable to extract the cobalt and then strip again from the cobalt extract solution to obtain a more concentrated solution of cobalt. This can be carried out, for example, using a phosphoric acid organic diester, as defined below for use for extracting manganese. Cobalt can be extracted using such phosphoric diester by increasing the pH of the cobalt strip solution to above 3.5 up to about 6, and preferably in the range of from 3.5 to about 4.5. The cobalt can be stripped from the extract with an acidic water solution having at least the stoichiometric amount of hydrogen ion to replace cobalt. The concentration of the cobalt can be determined by the volume ratio of the organic phase to the aqueous phase in the stripping procedure.

Preferred such amine extracting agents include secondary, tertiary and quaternary hydrocarbyl amines, and most preferably trialiphatic amines. Materials which are capable of extracting cobalt value are trihydrocarbylamines, such as tri(aryl)amines, tri(alkyl)amines or tri(alkyl)(aryl)amines, including the tri-(cycloalkyl)amines. The tri-(alkyl)amines are preferred and include alkyl groups having from about 5 to about 15 carbon atoms and optimally from about 8 to about 10 carbon atoms. Although both normal and branched chain alkyl groups can be utilized, preferably branched chain groups are used. Examples of the useful tri(alkyl)amines include tri-(isooctyl)amine, tri-(n-octyl)amine, di-(isooctyl)(n-hexyl)amine, di-(n-octyl)(n-hexyl)amine, di-(n-octyl)(n-hexyl)amine, tri-(2-ethylbutyl)amine, tri-(2-ethylhexyl)amine, di-(n-octyl)(n-decyl)amine, di-(n-decyl)(n-octyl)amine and tri-(n-decyl)amine. Secondary-amines, such as N-lauryl-N-trialkylmethylamines, and quaternary amines, such as tri-($C_{8-10}$ n-alkyl) methyl ammonium chlorides can also be used.

The manganese in the cobalt strip solution from the organic amine extract can be selectively separated from the cobalt by extracting with an ion exchange agent. Preferred ion exchange agents for manganese extraction are diesters of phosphoric acid, for example, having the general formula:

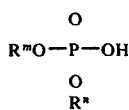

wherein the R groups are hydrocarbyl groups and preferably alkyl groups containing from 6 to about 12 carbon atoms each. Preferred R groups, include 2-ethylhexyl, isodecyl, 2-ethylbutyl and octyl. Examples of useful compounds include di(2-ethylhexyl) phosphoric acid, di(isodecyl) phosphoric acid, (2-ethylhexyl) (2-ethylbutyl)phosphoric acid and di(octyl)phosphoric acid.

The preferred ion exchange agents for extracting the nickel values from the aqueous solutions are known as chelates, and thus remove only the metal values from the solution leaving behind the anions. Generally, the anions in the aqueous solution have substantially no effect on the nickel extraction procedure and any anion can be present in the solution. The only caveat is that the anions must be inert to, or substantially nonreactive with, the chelate and not interfere with the chelation or extraction of the metal value. For example, if the anion portion tends to complex with either the metal or the chelate, there may be some interference preventing complete separation of the nickel from the aqueous solution.

Preferred ion exchange extracting agents useful for extracting nickel in the present procedure include the substituted 8-hydroxyquinolines and substituted alpha-hydroxyoximes defined below.

The 8-hydroxyquinoline compounds, which are especially useful for the separation of the metal values in accordance with the present process, can generally be defined by the following formula:

I. 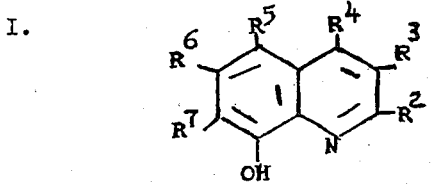

wherein each of the R groups can be hydrogen or a hydrocarbyl group or inertly-substituted hydrocarbon groups, such as alkenyl, alkyl, alkynyl, cycloalkyl, cycloalkenyl, aryl or combinations thereof, such as alkaryl, aralkyl, aralkenyl, alkyl-cycloalkyl, etc.

At least one of the R groups, however, must be a hydrocarbon group. Any inert substituent can be present, as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2% by weight in the organic solvent.

The preferred position of the hydrocarbyl substituent of the 8-hydroxyquinoline nuclear structure is such as to preferentially complex with the desired metal ion in the aqueous solution. The sum of the carbon atoms in the R groups must be at least about 8 and can be high as 24 or more. The preferred R groups are alkylbenzyl groups or beta-alkenyl groups containing from 12 to 18 carbon atoms, preferably attached at the $R^5$, $R^6$, or $R^7$ position. The optimum position for substitution is at the $R^7$ position to obtain the highest degree of efficiency. For a more complete description of these hydrocarbyl-substituted 8-hydroxyquinolines, see Republic of South Africa specification No. 69/4397 to Budde Jr. et al, assigned to Ashland Oil, Inc.

Representative compounds useful for ion exchange and within the scope of the above general formula I are: 7-octylbenzyl-8-hydroxyquinoline, 7-dodecyl benzyl-8-hydroxyquinoline, 7-nonylbenzyl-8-hydroxyquinoline, 7-ditertiarybutyl benzyl-8-hydroxyquinoline, 7-hexadecenyl-8-hydroxyquinoline, 7-dibenzyl-8-hydroxyquinoline, 7-dimethyldicyclopentadienyl-8-hydroxyquinoline, 7-dicyclopentadienyl-8-hdyroxyquinoline, 7-dodecylphenyl-8-hydroxyquinoline, 7-phenyl-dodecenyl-8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The second preferred type of extracting agents are the substituted alpha-hydroxyoximes, which are disclosed inter alia in U.S. Pat. Nos. 3,224,873; 3,276,863 and 3,479,378. These materials have the general formula:

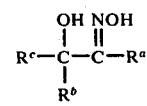

wherein the $R^a$, $R^b$, and $R^c$ groups can be any of a variety of organic, hydrocarbon radicals such as aliphatic and alkyl-aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^c$ are also preferably the same, and when alkyl are preferably linked to the central carbon atoms by a secondary carbon atom. $R^b$ is preferably hydrogen or unsaturated hydrocarbon or branched chain alkyl group containing from about 6 to about 20 carbon atoms. The oxime preferably contains a total of from about 14 to about 40 carbon atoms. Useful $R^a$, $R^b$ and $R^c$ groups include in addition to hydrogen, the mono- and poly-unsaturated groups such as heptenyl, octenyl, decenyl, octadecenyl, octadecynyl, and 2-ethyl-octadecenyl.

Alkyl groups include 2-ethylhexyl, 2,3-diethylheptyl, 2-butyldecyl, 2-butylhexadecyl, 2,4-ethylbutyldodecyl, 4-butylcyclohexyl, and the like. Examples of the preferred alphahydroxyoximes include 19-hydroxyhexatriaconta-9,27-dien-18-oxime; 5,10-diethyl-8-hydroxytetradecan-7-oxime; 5,8-diethyl-7-hydroxydodecane-6-oxime.

Generally, the nickel can be extracted with the above liquid ion exchange agent from the cobalt-free aqueous raffinate solution if the solution is maintained at a pH of from about 3 to about 7. Preferably, the pH of the aqueous solution is maintained at from about 3.5 to about 5, with the best results being obtained at a pH of from about 3.5 to about 4.5. Operating at too high a pH can result in the precipitation of the metal values which may be present, such as nickel and manganese.

When the nickel is to be extracted, it is preferred that certain metal values not be present in the pregnant aqueous solution or that they be removed before this process is initiated. For example, if an aqueous solution to be treated in accordance with this invention has a pH of less than about 2.5, it is advisable to remove any dissolved ferric iron or aluminum values before increasing the pH to 3 or higher. Iron or aluminum values form precipitates at higher pH's which are very difficult to separate interfere with proper phase separation during the liquid extraction stages of this process. Generally, it is to be understood, that the pregnant aqueous solution is to be substantially free of any material which would interfere with the process of this invention.

It is also generally useful to remove other materials before carrying out certain steps of the procedure described herein. For example, any cupric value present, e.g. cupric halide, should be removed prior to extracting nickel, in order to obtain a pure nickel extract.

In order to maintain the pH in the desired range during the liquid ion exchange extraction procedures, it is generally necessary to add a basic reagent. The chelating agents and the phosphoric acid diesters act by releasing hydrogen ions when extracting metals, and thus the pH decreases during the extraction unless a basic reagent is added. Caustic soda solution is preferably used; the sodium ion does not interfere with the further processing of any metal salt and the caustic soda is not especially expensive. However, other basic reagents can be used including generally alkali metal oxides and hydroxides, alkaline earth metal hydroxides and oxides, and the corresponding carbonates of the alkali metals and alkaline earth metals. Examples of such materials include calcium hydroxide, potassium hydroxide, lithium hydroxide, lithium carbonate, magnesium carbonate, calcium carbonate, ammonium hydroxide, and ammonium carbonate. In addition, hydroxides of other metals which are normally present in the aqueous solution and which will not interfere with any further required process of the solution can be utilized.

The amine extracting agents for the cobalt are not hydrogen ion exchange agents, and therefore do not require the addition of a base during the cobalt extractions. These amines are anion exchangers.

An acid aqueous solution can be used to selectively strip nickel from the nickel-containing organic extract following the extraction of the nickel from the aqueous solution. It is only necessary that the total amount of hydrogen ion (H+) present in the total stripping liquid must be slightly in excess of that required to displace the nickel in the nickel-organic extract. Useful stripping acids include, for example, sulfuric acid, nitric acid, chloracetic acid, hydrochloric acid, hydrobromic acid and hydroiodic acid, depending upon the nickel salt which is desired. Each of the extracting media should be immiscible with water or otherwise readily separable from aqueous solutions, in order to improve the economic efficiency of the process. If the extracting medium were not readily separable from the water, or aqueous solution, a substantial loss of the extracting reagent would occur during each extraction, i.e., there would be at least a partial solubility in the aqueous phase and a loss of the extracting agent in the aqueous raffinate. Therefore, generally, immiscible extracting mediums are utilized. The extracting agent can be itself a liquid which is completely immiscible with water, or aqueous solutions, or as is commonly the case, the extracting agent is dissolved in a solvent for the extracting agent which is substantially immiscible with water, to form a water-immiscible extracting medium.

It has been found when utilizing the commercially available alpha-hydroxyoximes or 8-hydroxyquinolines or the organic amines or phosphoric acid diesters, that they can be dissolved into solutions containing from about 2 to about 50% and preferably from about 5 to about 30% by weight of the extracting agent and remain economically useful and sufficiently active to remove the nickel and/or cobalt values from the aqueous solution while being sufficiently dilute so that substantially no extracting agent is leached out by and lost in the aqueous raffinate. If it is desired, however, more concentrated solutions can be utilized. Mixtures of extracting agents can be used as long as they are not jointly reactive and do not interfere with the process of this invention.

Such solvents include generally any inert hydrocarbons which are solvents for the extracting agent, per se, and for the metal-extracting agent complex, and which do not react with any of the other materials present under the conditions of the extraction process. Generally, liquid aliphatic, cycloaliphatic, aromatic, cycloaliphatic-aromatic, aliphatic-aromatic or chlorinated such hydrocarbons are preferably utilized as the solvents for the metal-extracting medium. Optimally, the solvent has a specific gravity in the range of from about 0.65 to about 0.95 and a mid-boiling point in the range of from about 120° to 615°F. (ASTM distillation). However, substantially any liquid can be used as a solvent that meets the following criteria:

1. A solvent for the extracting agent;
2. A solvent for the extracting agent-metal complex;
3. Immiscible with water; and
4. Readily separable from water.

Examples of suitable solvents include benzene, toluene, xylene, aliphatic and aromatic petroleum fractions such as naphtha and derivatives thereof and mixtures of the foregoing. In addition to the aliphatic, aromatic, cycloaliphatic-aromatic, aliphatic-aromatic hydrocarbons and cycloaliphatic hydrocarbons, chlorinated such hydrocarbon liquids can also be usefully utilized.

Light fuel oil, high flash point kerosene and other petroleum hydrocarbons, such as hexane-heptane mixtures are preferred. Generally, the aliphatic materials are most preferred for the nickel and manganese extractions because of their ready availability and ease of separation from the aqueous phase. Aromatic solvents are generally most effective as solvents for the organic amines in the cobalt extraction.

The concentration of the extracting agent in the solvent is determined not only by the solubility of the extracting agent per se, but also by the solubility of the extracting agent-metal complex.

In addition to the solvent and the extracting agent, there can preferably also be present in the extracting medium a phase modifier which prevents formation of an emulsion with, or entrainment of, the organic phase in the aqueous phase. This is accomplished, it is believed, by altering the interfacial tension and related physical properties of the organic-aqueous mixture during extraction. These phase modifiers also help to prevent third phase formation and are generally most useful when an aliphatic solvent is utilized and include, preferably, aliphatic alcohols containing from about 8 to about 16 carbon atoms, such as n-octyl alcohol, n-decyl alcohol, n-dodecyl alcohol, n-tetradecyl alcohol, n-hexadecyl alcohol, isooctyl alcohol, 2-ethylhexyl alcohol, cyclohexanol and mixtures of these and other alcohols. Decanol is a preferred material.

Generally no more than the necessary amount of the phase modifier, e.g., alcohol, which is necessary to inhibit the formation of the emulsion or prevent entrainment, should be used. Usually no more than about 25% by volume of the phase modifier is necessary. Preferably, from about 2 to about 10% by volume is satisfactory and not more than about 5% is most preferred. The phase modifier can be completely eliminated if desired, and, therefore, is optional in the present procedure.

When utilizing liquid-liquid extraction from an aqueous solution of mixed metal values, a wide range of aqueous phase-to-aqueous-immiscible-phase volume ratio can be utilized in the present invention. Generally, using a 20% by wt. solution of an extracting agent, aqueous-immiscible/aqueous phase volume ratios of from about 10:1 to about 1:10 are desirable.

The extracting steps and the stripping steps in the present process are preferably carried out by liquid-liquid contact utilizing any conventional liquid-liquid contact apparatus. The procedure can be carried out in a single stage batch operation or in a continuous flow unit. Preferably, in a continuous unit, the flow of the two phases is counter-current, such as in a continuous counter-current mixer-settler unit, or in a pulse column.

Useful apparatus in addition to mixer-settler units and pulse columns include, for example, packed and plate-type towers, and baffled towers, preferably, operated countercurrently.

The number of stages can be varied, as required, based on the efficiency of extraction and stripping of the specific materials being treated and of the apparatus being utilized. By adjusting the relative volumes of the aqueous mixed metal salt solution and of the water-immiscible extracting medium, it is possible to obtain substantially complete extraction of the metal values from the aqueous solution into the extracting medium. Similarly, by adjusting the ratio of the extract phase to the aqueous stripping liquid, substantially complete stripping of the metal values from the extract phase into the stripping liquid can also be obtained. It is recognized that in continuous operation there is a residual metal value remaining in the extracting medium following stripping. The extracting medium containing this residual metal value can be recycled for further extraction use.

As pointed out above, the process according to the present invention is especially applicable to the separation of aqueous solutions derived from the refining of ocean floor nodule ores. Such ores are initially reacted with a reagent to prepare water-soluble salts of the metal values present in the ore, and the salts can then be leached into an aqueous solution. The initial reagents include any halidating agents which result in the halide salts of the metal values, e.g., hydrogen halide, elemental halogen, and molten alkali metal halides or molten alkaline earth metal halides. In each case, the salts can be leached by various means to form an aqueous solution comprising nickel and cobalt salts as well as salts of copper and large amounts of manganese and smaller amounts of other metal salts. In addition, depending upon the procedure utilized for initially reacting the ore, iron salt can also be present in the initial solution. For a more complete exposition on the procedure for initially reacting the ocean floor nodule ore and for obtaining aqueous solutions of mixtures of the halides of the metal values from the ore, see German Specifications No. 2,126,175 and P 22 47 629.5.

Generally, temperature is not an important parameter in carrying out the process of the present invention. The extraction and stripping procedures can be carried out at any temperature below the boiling point of the various reagents an preferably at substantially ambient temperatures, or at the temperature at which the aqueous solution is obtained from the preceding step in the refining procedure.

The nickel-cobalt separation procedures of this invention can be applied to pregnant aqueous solutions which are derived from the leaching of various nickel and cobalt-containing ores, as well as from other sources, e.g. spent electroplating solutions and spent stainless steel acid pickling liquors from which it is desired to scavenge the nickel and cobalt values.

Referring to the drawings:

FIG. 2 is a plot showing the variation in the proportion of manganese and cobalt stripped from the first extract with variations in chloride ion concentration.

Figure 1:
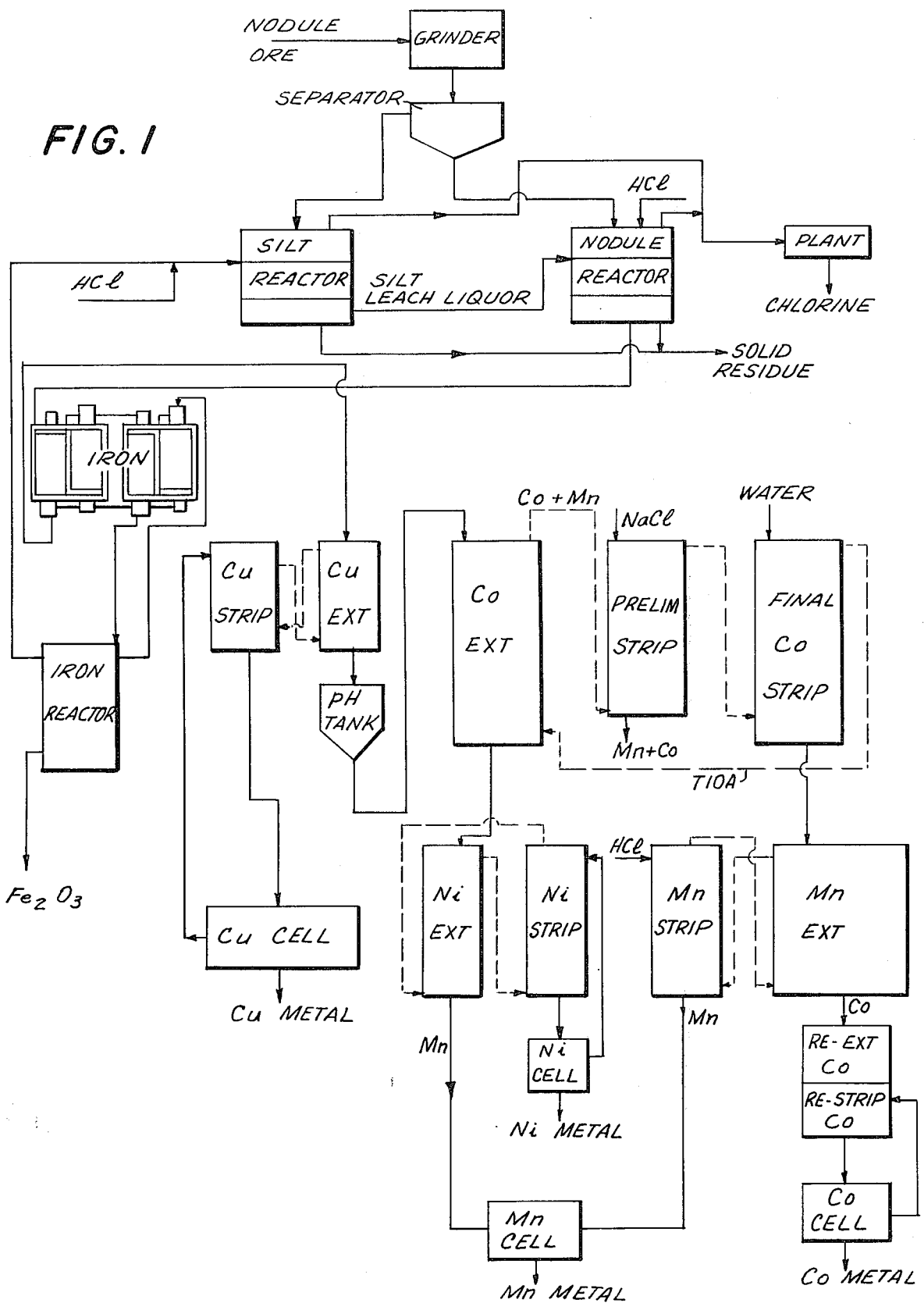
FIG. 1 is a schematic flow diagram of the preferred procedure in accordance with the present invention.

Referring to FIG. 1, ocean floor nodule ore is reacted with an aqueous solution of a hydrogen halide. A pregnant aqueous solution is separated from the reacted ore and the metal values are then individually separated from the aqueous solution. The nickel and cobalt are separated in accordance with the process of the present invention.

The following examples describe preferred embodiments of the present invention, but are exemplary and not exclusive of the scope of this invention.

EXAMPLE I

Ocean floor nodule ore was obtained having the following composition:

| COMPONENTS | PERCENT BY WEIGHT |
|---|---|
| Manganese | 27.7 |
| Iron | 6.03 |
| Nickel | 1.30 |
| Copper | 1.06 |
| Cobalt | 0.26 |
| Other Metals | Minor |

Referring to FIG. 1, the ore was ground to an average particle size of less than 35 mesh. The ground ore was treated in a hydroclassifier to separate fine silt particles, as overflow. The overflow nodule particles were then passed through a 3-stage leaching-reactor system, countercurrent to an aqueous solution of hydrogen chloride, fed at an initial concentration of hydrogen ion of 11 Normal. The overflow solution from the final stage, plus additional, anhydrous hydrogen chloride, was fed to a 5-stage leaching-reactor system in which the HCl solution flowed countercurrent to the underflow nodule particles; the overflow solution from the final stage was the pregnant aqueous solution comprising manganese chloride, ferric chloride, cobalt chloride, nickel chloride and copper chloride having a pH of 1 which is next treated to remove iron chloride from the solution.

The pregnant aqueous solution is passed through 4 mixer-settler stages, countercurrent to an organic solution comprising 10% by volume N-lauryl-N-(1,1-dimethylhexyl)-amine, i.e., having the formula

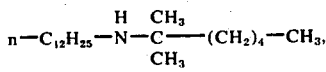

15% by volume isodecanol and kerosene solvent, at an aqueous-to-organic ratio of 1:2, by volume.

The organic extract containing FeCl₃ is stripped with water, having a pH of 1, in a countercurrent, 3-stage mixer-settler system at an organic-to-aqueous ratio of 2:1 by volume. The aqueous stripping solution of FeCl₃ is then passed to an FeCl₃ reactor, where the water is evaporated and the FeCl₃ hydrolyzed by reaction with water at a temperature of about 200° C to form HCl and Fe₂O₃. The HCl produced is cycled to the silt reactor.

The aqueous raffinate from the FeCl₃ extraction has the following composition:

| Metal Value | Composition (g/l of metal) |
| --- | --- |
| Mn | 200 |
| Cu | 7.68 |
| Co | 1.84 |
| Ni | 9.46 |
| Other Metals | Trace |

The pH of the FeCl₃ raffinate is adjusted to about 2, generally 15 to 25 The raffinate is extracted with an extracting medium comprising 3% by wt. 7-[3-(5,5,7,7-tetramethyl-1-octenyl)]-8-hydroxyquinoline, in 85% Napoleum hydrocarbon solvent and 12% nonylphenol in a 3-stage, countercurrent mixer-settler system at a volume ratio of organic-to-aqueous phases of 2:1 to remove copper. The organic extract phase is stripped with the sulfuric acid solution generated in an aqueous copper sulfate electrolysis operation in a countercurrent, 3-stage mixer-settler system. The regenerated extracting medium is recycled and contacted with additional FeCl₃ raffinate.

The pH of the aqueous raffinate from the copper extraction step is adjusted to about 3.5 by the addition of 2N caustic solution, and then contacted countercurrently with a solution containing 25% by volume of tri-isooctylamine in aromatic solvent, in a 4-stage, countercurrent mixer-settler system. The aqueous-to-organic volume ratio in the extraction system was 1:2. The organic phase amine extract contains substantially all of the cobalt from the aqueous solution plus a minor proportion of the manganese originally present.

The amine phase is next contacted with an aqueous stripping solution containing 3N NaCl in a three-stage mixer-settler system, with an aqueous-to-organic volume ratio of 1:5. The organic phase from the stripping procedure, containing some of the manganese and most of the originally extracted cobalt, is then contacted countercurrently with an aqueous acid solution at a pH of 2 in a three-stage mixer-settler system, at an aqueous-to-organic volume ratio of 1:5, to strip out the remaining cobalt halide and manganese halide into a final aqueous strip solution.

The pH of the final strip solution is adjusted to about 3 by the addition of 2N sodium hydroxide and contacted counter-currently with a 10% by volume solution of di-(2-ethylhexyl)-phosphoric acid in kerosene, 10% by volume isodecanol, in a 2-stage mixer-settler system to extract the remaining manganese, with pH controlled at about 3, with a caustic solution. The organic extract containing the manganese is then countercurrently stripped through two mixer-settler stages with a dilute aqueous hydrochloric acid solution having a pH of 1. The aqueous strip solution remains with substantially pure cobalt chloride.

The concentration of the cobalt in the aqueous strip solution can be increased by reextracting the cobalt from the weakly acidic aqueous solution using a liquid ion exchange agent, for example a dialkyl phosphoric acid, e.g. di-(2-ethylhexyl)phosphoric acid, in a solution of 10 volume percent in kerosene which contain 10% by volume isodecanol. The aqueous solution is maintained at a pH of 4 during this extraction. The cobalt is then stripped from the organic extract using a smaller proportion of the electrolyte solution from the cobalt electrolyte cell to which has been added sufficient HCl to provide a slight excess over the stoichiometric amount of hydrogen needed to replace the cobalt.

The pH of the cobalt raffinate is adjusted to a pH of about 3.5 and then contacted with another sample of the same hydroxyquinoline extracting medium as above, in 3 stages, counter-currently to extract nickel. During both extractions caustic soda solution is added continuously to maintain the required pH.

The organic extract phase, containing the extracted nickel, is stripped of the nickel, using the electrolyte solution from a nickel aqueous electrolysis cell (to which has been added sufficient HCl to replace the nickel in the hydroxyquinoline), countercurrently in a three-stage mixer-settler system.

EXAMPLE 2

The procedures of Example 1 were repeated but a 6N solution of hydrogen chloride was used to initially strip the cobalt halide/manganese halide-amine extract. The acid strip solution is then recycled and mixed with the aqueous acid feed to the initial hydrochlorination reaction procedure.

EXAMPLE 3

An organic extract solution was prepared comprising 10% by volume tri(isooctyl)amine, in aromatic solvent, 0.16 grams per liter (gpl) cobalt, as cobalt chloride, and 8.7 gpl manganese, as manganese chloride. This organic solution was mixed, batchwise, with an aqueous liquid, at 70° F and at an organic phase-to-aqueous phase volume ratio of 5:1. The mixture was permitted to settle and the lower, aqueous phase drawn off and analyzed for cobalt and manganese content. Several batches of the same organic solution were treated, each with an aqueous stripping liquid containing a different amount of sodium chloride, as set out in terms of chloride ion concentration, Molarity, in Table 1. The analyses of the aqueous phase and the manganese-to-cobalt ratio in each aqueous phase are also set forth in Table 1.

| ANALYSES OF AQUEOUS PHASE | | | |
| --- | --- | --- | --- |
| Conc. Chloride ion (M). in Aqueous phase | Cobalt as metal (gpl) | Manganese, as metal (gpl) | Manganese-to-cobalt ratio (wt.) |
| 0 | 0.8 | 43.5 | 54 |
| 0.85 | 0.19 | 39 | 205 |
| 1.7 | 0.11 | 35 | 318 |
| 2.5 | 0.03 | 30 | 1000 |

-continued

ANALYSES OF AQUEOUS PHASE

| Conc. Chloride ion (M). in Aqueous phase | Cobalt as metal (gpl) | Manganese, as metal (gpl) | Manganese-to-cobalt ratio (wt.) |
|---|---|---|---|
| 3.4 | 0.02 | 26 | 1300 |

The results set forth in the first and last columns of Table 1 were plotted and are set out in FIG. 2. As shown, the proportion of cobalt stripped can be reduced to an insubstantial amount when a concentrated chloride solution is used. By using an even more soluble chloride source than common salt, an even lower proportion of cobalt can be stripped, if warranted.

As shown, a relatively dilute chloride solution can result in the stripping out of a major proportion, i.e., more than half, of the manganese halide present in the organic phase, but is sufficient to suppress the stripping of all but a minor proportion, i.e. less than half, of the cobalt halide present in the organic phase.

What is claimed is:

1. A process for the separation of individual metal values from a pregnant aqueous solution comprising a mixture of dissolved metal values and halide ions; the solution comprising, as a primary metal value, manganese and, as secondary metal value, cobalt; the process comprising: (1) contacting the pregnant aqueous solution with an organic water-immiscible ion exchange liquid extracting medium, the medium comprising an organic amine extracting agent selected from a group consisting of secondary, tertiary and quaternary organic amines, and selective to extract cobalt from the pregnant aqueous solution so as to form an organic amine extract containing the cobalt value and a portion of the manganese value and a cobalt-free aqueous raffinate substantially depleted in cobalt; (2) contacting the organic amine extract with a preliminary aqueous stripping solution containing dissolved halide ion in a concentration of at least about 0.5 Molar to strip from the amine extract a major proportion of the manganese value but only a minor proportion of the cobalt value so as to form an intermediate organic amine phase substantially reduced in manganese value and a preliminary aqueous strip solution of most of the manganese value; (3) contacting the intermediate organic amine phase with an aqueous acidic solution to form an acidic cobalt water strip solution containing the cobalt halide and the remaining manganese halide and an organic extracting medium substantially depleted in both cobalt value and manganese value; and (4) contacting the cobalt water strip solution with a manganese-extracting ion exchange liquid extracting medium, the medium comprising an organic manganese-extracting agent designed and adapted to selectively extract manganese from the cobalt water strip solution without substantially extracting cobalt, until the cobalt water strip solution is substantially depleted in manganese, thus forming a manganese-free aqueous solution containing the cobalt value and a manganese-containing organic extract solution.

2. The process of claim 1, wherein the pregnant solution also contains nickel as a secondary metal value and the process comprises in addition contacting the cobalt-free aqueous raffinate with an organic water-immiscible liquid ion exchange extracting medium for nickel, the medium comprising a nickel-extracting ion exchange agent designed and adapted to extract nickel selectively from the cobalt-free aqueous raffinate until the aqueous solution is substantially depleted in nickel, thus forming a nickel-containing organic extract and a nickel-free aqueous raffinate substantially depleted in nickel and cobalt, and stripping the nickel value from the nickel-containing organic extract with an acidic aqueous solution to form an organic phase substantially depleted of nickel and an aqueous phase containing the nickel value substantially free of dissolved cobalt or manganese value.

3. The process of claim 2, wherein the nickel-extracting ion exchange agent is selected from the group consisting of hydrocarbon-substituted alpha-hydroxyoximes and hydrocarbon-substituted 8-hydroxyquinolines and comprising in addition maintaining the pH of the cobalt-free raffinate within the range of from about 3 to about 7, while contacting the cobalt-free aqueous raffinate with the nickel-extracting liquid ion exchange medium.

4. The process of claim 1, wherein the concentration of halide ion in the preliminary aqueous stripping solution is at least about 2 molar halide ion.

5. The process of claim 4, wherein the organic amine is a tri-hydrocarbylamine.

6. The process of claim 5, wherein the water used to form the cobalt water strip solution has pH in the range of from about 2 to about 6.

7. The process of claim 4, wherein the amine is a tri-alkylamine and wherein the preliminary aqueous stripping solution is substantially saturated in a halide salt selected from the group consisting of alkali metal halides, alkaline earth metal halides and ammonium halides.

8. The process of claim 4, wherein the preliminary aqueous stripping solution has a pH in the range of from about 2 to about 6.

9. The process of claim 8, wherein the preliminary aqueous stripping solution comprises dissolved therein a halide salt selected from the group consisting of alkali metal halides, alkaline earth metal halides and ammonium halides.

10. The process of claim 1, wherein the manganese-extracting agent is a phosphoric acid organic diester.

11. The process of claim 10, wherein the phosphoric acid diester is a dialkylester of phosphoric acid.

12. The process of claim 1, wherein the cobalt water strip solution is maintained at a pH of not greater than about 3.5 during the extraction of manganese, and wherein the manganese is extracted therefrom by a dialkylester of phosphoric acid and wherein the manganese is stripped from the manganese-phosphate diester organic extract using an aqueous acid solution.

13. A process in accordance with claim 1, wherein the pregnant solution of metal halides is prepared from ocean floor nodule ore comprising as major components the oxides of manganese and iron, and as secondary components, compounds of copper, cobalt and nickel, the process comprising the steps of (a) reacting the nodule ore with a halidating agent under reducing conditions to form a mixture comprising water-soluble halides of divalent manganese, trivalent iron, copper, nickel and cobalt and separating the iron from the remaining metal values, (b) forming an aqueous solution of the remaining water-soluble metal halides, (c) adjusting the pH of the aqueous solution to a value of not greater than about 2.5, (d) extracting copper from the aqueous solution with a liquid ion exchange medium to form a pregnant aqueous solution substantially free from copper and an organic phase containing copper, the pregnant aqueous solution comprising a major proportion of manganese and a secondary concentration of nickel and cobalt.

14. The process of claim 1, wherein the halide ion is a chloride ion.

15. In a process for separating nickel value from cobalt value from an aqueous solution containing nickel halide, cobalt halide and a primary proportion of manganese halide, the process comprising contacting the aqueous solution with an organic amine selective to extract cobalt from the aqueous solution, without extracting substantially any nickel, so as to form an organic extract containing the cobalt value and a cobalt-free aqueous raffinate containing the nickel value and a major portion of the manganese value, the organic amine extract also containing manganese value; preliminarily stripping the organic amine extract by contacting the organic extract with an aqueous solution containing halide ion in a concentration of at least about 0.5 Molar, whereby a major proportion of the manganese value, but only a minor portion of the cobalt value is stripped from the organic extract, so as to form an organic phase containing a major portion of the cobalt and a minor portion of the manganese and an aqueous phase containing manganese and a minor portion of the cobalt; stripping the remaining manganese value and the cobalt value from the organic extract by contacting the organic extract with an aqueous acidic solution to form an acidic aqueous final strip solution of the manganese and cobalt values; and then selectively re-extracting the manganese value from this final aqueous strip solution to form a substantially manganese-free solution.

16. The process of claim 15, wherein the preliminary stripping solution comprises at least about 2 molar normal halide ion.

17. The process of claim 16 wherein the preliminary stripping solution is an aqueous solution of a halide salt selected from the group consisting of alkali metal halides, alkaline earth metal halides and ammonium halides.

18. The process of claim 17, wherein the preliminary stripping aqueous solution has a pH in the range of from about 2 to about 6.

19. The process of claim 17, wherein the halide ion is a chloride.

20. The process of claim 19, wherein the preliminary stripping solution comprises sodium chloride.

21. The process of claim 19, comprising in addition re-extracting the cobalt value by contacting the manganese-free final solution with an organic diester of phosphoric acid to form an organic phase containing the cobalt value and stripping the cobalt from the organic phase with water to form a more concentrated aqueous solution of cobalt value.

* * * * *

UNITED STATES PATENT AND TRADEMARK OFFICE
CERTIFICATE OF CORRECTION

PATENT NO. : 3,984,520
DATED : October 5, 1976
INVENTOR(S) : Paul H. Cardwell and James A. Olander It is certified that error appears in the above—identified patent and that said Letters Patent are hereby corrected as shown below:

Column 14, line 67, correct "2,5" to read -- 2.5 --

Column 16, line 9, delete the word "normal".

Signed and Sealed this

Fourteenth Day of December 1976

[SEAL]

Attest:

RUTH C. MASON
Attesting Officer

C. MARSHALL DANN
Commissioner of Patents and Trademarks